(12) United States Patent
Bush et al.

(10) Patent No.: US 12,658,731 B2
(45) Date of Patent: Jun. 16, 2026

(54) SYSTEM AND METHOD FOR INTELLIGENT STATIC TRANSFER SWITCHING

(71) Applicant: VERTIV CORPORATION, Westerville, OH (US)

(72) Inventors: Terry D. Bush, Westerville, OH (US); Brian Heber, Ostrander, OH (US)

(73) Assignee: Vertiv Corporation, Westerville, OH (US)

( * ) Notice: Subject to any disclaimer, the term of this patent is extended or adjusted under 35 U.S.C. 154(b) by 34 days.

(21) Appl. No.: 18/955,593

(22) Filed: Nov. 21, 2024

(65) Prior Publication Data

US 2025/0219443 A1     Jul. 3, 2025

Related U.S. Application Data

(60) Provisional application No. 63/615,573, filed on Dec. 28, 2023.

(51) Int. Cl.
| | |
|---|---|
| *H02J 9/06* | (2006.01) |
| *H02J 3/00* | (2026.01) |
| *H02J 3/0012* | (2026.01) |

(52) U.S. Cl.
CPC ............ *H02J 9/068* (2020.01); *H02J 3/0012* (2020.01); *H02J 9/062* (2013.01)

(58) Field of Classification Search
CPC .......... H02J 9/068; H02J 3/0012; H02J 9/062
See application file for complete search history.

(56) References Cited

U.S. PATENT DOCUMENTS

| | | | |
|---|---|---|---|
| 2017/0294778 A1 | 10/2017 | Nguyen | |
| 2025/0096551 A1* | 3/2025 | Habib .................... | H02H 3/066 |
| 2025/0149913 A1* | 5/2025 | Kendzia, III .......... | H01H 9/542 |
| 2025/0192542 A1* | 6/2025 | Kendzia, III .......... | H02J 9/068 |

FOREIGN PATENT DOCUMENTS

| | | |
|---|---|---|
| CN | 116500379 A | 7/2023 |
| EP | 2731230 A1 | 5/2014 |

OTHER PUBLICATIONS

European Search Report received in EP Application No. 24220934.4, May 20, 2025, 9 pages.

* cited by examiner

*Primary Examiner* — Rexford N Barnie
*Assistant Examiner* — Duc M Pham
(74) *Attorney, Agent, or Firm* — Suiter Swantz IP

(57) ABSTRACT

An intelligent static transfer switch provides a primary voltage source to a destination facility via a primary power supply, monitoring the voltage level associated with the primary power supply. When the primary voltage drops below a threshold level (e.g., conditions normally associated with a transfer to a backup power supply), the switch samples the waveform of the primary voltage and compares the sampled waveform to reference waveforms stored to memory, each reference waveform corresponding to an order to allow or inhibit the transfer to backup power. When the sampled waveform matches a reference waveform, the switch carries out the corresponding order (allow or inhibit). When there is no match, the switch allows transfer to backup power but continues to monitor the sampled waveform to determine whether the transfer should have been allowed or inhibited. The sampled waveform is added as a reference waveform with the appropriate allow or inhibit order.

18 Claims, 6 Drawing Sheets

300

400

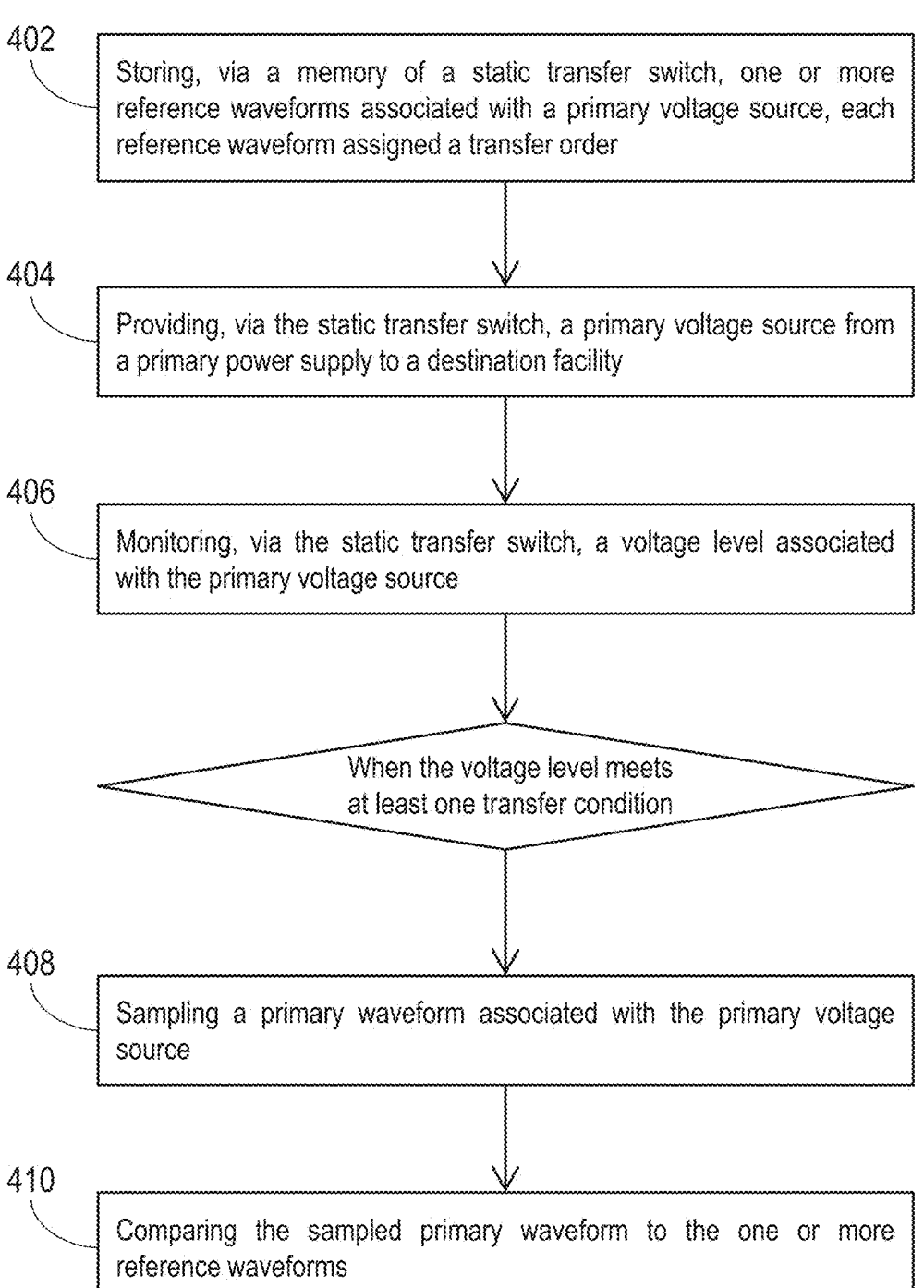

402
Storing, via a memory of a static transfer switch, one or more reference waveforms associated with a primary voltage source, each reference waveform assigned a transfer order 404
Providing, via the static transfer switch, a primary voltage source from a primary power supply to a destination facility 406
Monitoring, via the static transfer switch, a voltage level associated with the primary voltage source When the voltage level meets at least one transfer condition 408
Sampling a primary waveform associated with the primary voltage source 410
Comparing the sampled primary waveform to the one or more reference waveforms

FIG. 4A

When the primary waveform matches a first reference waveform

When the primary waveform does not match the reference waveforms

412 Executing, via the static transfer switch, the transfer order assigned to the first reference waveform 416 Disconnecting the static transfer switch from the primary power supply 414 Assigning the executed transfer order to the primary waveform 418 Connecting the static transfer switch to a backup power supply 420 Determining, via the static transfer switch, a transfer order associated with the primary waveform by analyzing the primary waveform

FIG. 4B

SYSTEM AND METHOD FOR INTELLIGENT STATIC TRANSFER SWITCHING

CROSS-REFERENCE TO RELATED APPLICATIONS

The present application claims the benefit under 35 U.S.C. § 119(e) of U.S. Provisional Patent Application Ser. No. 63/615,573 filed Dec. 28, 2023 and titled SYSTEM AND METHOD FOR INTELLIGENT STATIC TRANS-FER SWITCHING Said U.S. Provisional Patent Application 63/615,573 is incorporated herein by reference in its entirety.

TECHNICAL FIELD

The present disclosure is directed generally to the field of power distribution, and more particularly to switching systems for alternating current (AC) power supplies to data centers and like facilities.

BACKGROUND

Static transfer switches detect if a source voltage of a power source (e.g., providing a critical load to a data center or like facility) falls below a preprogrammed level, in which case the switch will transfer to an alternate or backup power source before the primary power source fails completely, thereby maintaining the critical load. However, temporary voltage disturbances may occur with respect to the primary power source but may not be indicative of critical failure. For example, an uninterruptible power supply (UPS) may transfer among operating modes, e.g., double conversion, bypass, eco, VI. Further, other customer loads drawing from the primary power source may activate. Capacitive loads banks may be switched in or out by utility grid operators when compensating reactive load. Any of these events may trigger an unnecessary transfer to backup power on the part of the static transfer switch.

Due to a level of risk associated with any change in critical load power flow, data center managers are reluctant to initiate automatic power distribution configuration changes unless they are absolutely necessary. Accordingly, data center managers may adjust the low voltage detection parameters of the static transfer switch to reduce or avoid such unnecessary transfers, e.g., by reducing the threshold voltage or adding a time delay to any successful low voltage detection. However, this course of action also introduces risk in that it may prevent the static switch from transferring to backup power when conditions warrant doing so, leading in the long term to a balancing act wherein adjustments may err on the side of caution and oversensitivity to ensure that any necessary transfer will occur even if a number of unneces-sary transfers cannot be avoided. Further, some data center environments may employ a single alternate power supply as a backup for multiple static switches; if too many static switches are initiating unnecessary transfers to backup at once, the alternate power source may likewise become oversubscribed and its load capacity strained.

SUMMARY

In a first aspect, an intelligent static transfer switching system is disclosed. In embodiments, the switching system includes a static transfer switch (STS) connected to a primary or main power supply and one or more backup power supplies. The STS provides a voltage source from the primary power supply to a data center or other like desti-nation facility when connected thereto. The switching sys-tem includes a memory for storing reference waveforms observed from the voltage source (or upon which the STS has been trained), each reference waveform stored with an appropriate transfer order: allow transfer (e.g., transfer to backup power if this waveform is observed) or inhibit transfer (e.g., prevent transfer to backup power if this waveform is observed). The switching system continually monitors the voltage level associated with the primary power supply. If, for example, the voltage meets conditions warranting a transfer to backup power, the switching system samples the primary waveform associated with the voltage level and attempts to find a matching reference waveform to determine whether a transfer to backup power should occur. If a reference waveform matches the sampled waveform, the switching system executes the order assigned to that refer-ence waveform (allow or inhibit) and assigns that order to the sampled waveform as well. If there is no matching reference waveform, the switching system transfers to backup power (e.g., allowing the transfer) and continues to analyze the primary waveform to confirm whether or not the transfer was actually necessary (e.g., if the transfer was necessary, the primary waveform should be assigned an allow-transfer order; if the transfer was not necessary, the primary waveform should be assigned an inhibit-transfer order).

In some embodiments, the switching system stores the sampled waveform and its assigned transfer order (either the executed transfer order assigned to the matching reference waveform, or the transfer order determined on the basis of comparing the sampled waveform to non-matching refer-ence waveforms) as a reference waveform.

In some embodiments, the transfer order is an allow-transfer order (transfer to backup power) or an inhibit-transfer order (do not transfer to backup power).

In some embodiments, the reference waveform is assigned an inhibit-transfer order, but subsequent analysis observes transfer conditions to persist for at least a threshold duration. Further, the switching system allows the transfer to backup power.

In some embodiments, after allowing the transfer, the switching system reassigns the allow-transfer order to the reference waveform (e.g., reclassifying the reference wave-form from inhibit-transfer to allow-transfer) and further assigns the allow-transfer order to the sampled primary waveform (e.g., for storage as a reference waveform).

In some embodiments, conditions warranting a transfer to backup power include a voltage drop below a threshold voltage level.

In some embodiments, when the sampled primary wave-form does not match a reference waveform, the switching system allows the transfer to backup power but continues to analyze the primary waveform to determine whether or not the transfer was warranted.

In some embodiments, the switching system includes neural networks trained according to appropriate machine learning algorithms to assign the appropriate transfer order (allow or inhibit) to the sampled primary waveform when no reference waveform matches.

In some embodiments, the switching system samples the primary waveform at no less than a minimum sampling rate, e.g., 6 kHz.

In a further aspect, a method for intelligent static transfer switching is disclosed. In embodiments, the method includes storing to memory, via a static transfer switching system, reference waveforms including an assigned transfer order:

allow transfer (e.g., allow a transfer to backup power in response to this waveform) or inhibit transfer (e.g., do not transfer to backup power in response to this waveform). The method includes providing a primary voltage source, e.g., a primary power supply serving a data center or like destination facility. The method includes monitoring the voltage level of the primary power supply. The method includes, when the voltage level meets one or more conditions warranting a transfer to backup power, sampling the primary waveform associated with the voltage source. The method includes comparing the sampled primary waveform to the stored reference waveforms to find a sufficient match for the primary waveform. When a reference waveform sufficiently matches the sampled primary waveform, the method includes executing the transfer order (allow or inhibit) associated with the matching reference waveform. The method further includes assigning the transfer order of the matching waveform to the sampled primary waveform as well, e.g., for storage as a reference waveform. When no reference waveform matches the sampled primary waveform, the method includes executing the transfer to backup power but continuing to analyze the primary waveform to determine if allowing the transfer was necessary, and thereby the corresponding transfer order to assign to the primary waveform (allow if the transfer was necessary, inhibit if the transfer was unnecessary).

In some embodiments, the method includes storing the primary waveform as a reference waveform assigned the executed transfer order of the matching reference waveform (if a match was found) or the transfer order determined via waveform analysis (if no match was found, and based on whether the allowed transfer was necessary or not).

In some embodiments, a transfer order is either an allow-transfer order, e.g., allow the transfer to backup power, or an inhibit-transfer order, e.g., inhibit or prevent the transfer to backup power.

In some embodiments, when the matching reference waveform is assigned an inhibit-transfer order (and consequently no transfer to backup power occurs) but transfer conditions persist for at least a maximum low voltage duration, the method includes allowing the transfer to backup power.

In some embodiments, the method further includes changing the assigned transfer order of the matching reference waveform from inhibit-transfer to allow-transfer. The method further includes saving the sampled primary waveform to memory as a reference waveform assigned the allow-transfer order.

In some embodiments, the persisting transfer conditions includes a voltage drop (e.g., below a threshold low voltage) or disturbance persisting for at least the maximum low voltage duration.

In some embodiments, the method includes determining a transfer order for the sampled primary waveform by comparing the primary waveform to stored reference waveforms, e.g., in order to find a sufficiently matching reference waveform.

In some embodiments, the method includes determining the transfer order for the sampled primary waveform via neural networks trained on machine learning algorithms.

In some embodiments, the method includes sampling the primary waveform at not less than a minimum sampling rate, e.g., 6 kHz.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

and FIGS. 4A through 4D are process flow diagrams illustrating a method for intelligent static transfer switching according to example embodiments of the inventive concepts disclosed herein.

DETAILED DESCRIPTION

Figure 1:
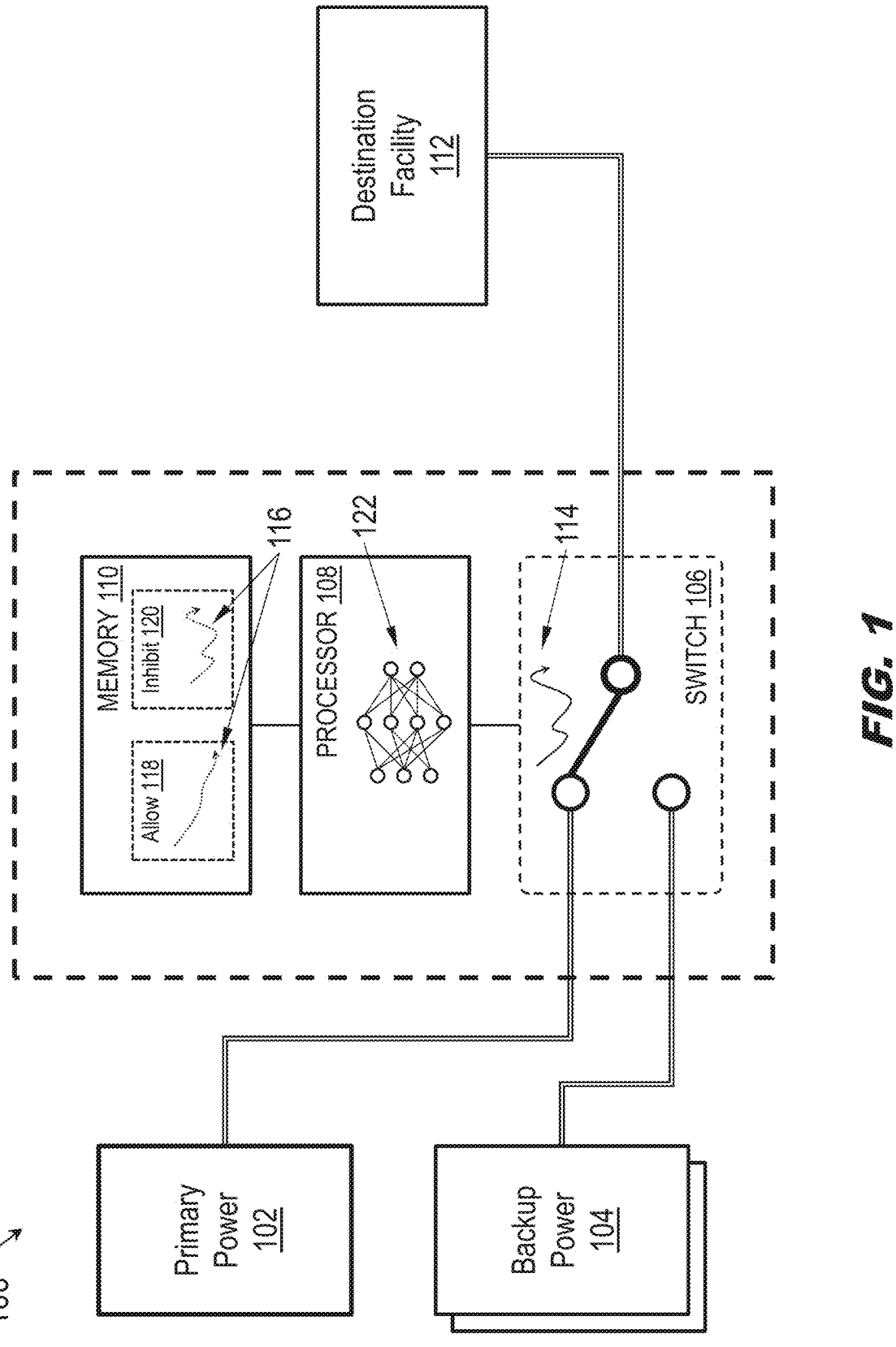
FIG. 1 is a block diagram of an intelligent static transfer switching system for a power distribution system according to example embodiments of the inventive concepts disclosed herein.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to an intelligent static transfer switching system capable of monitoring the voltage level of the primary power source and learning whether, when a voltage disturbance is detected, whether the static transfer switch should or should not transfer to a backup power source. For example, the switching system samples waveforms associated with voltage disturbances and includes a neural network trained (e.g., via observation of prior waveforms and how the switching system reacted) to differentiate those voltage disturbances that present a legitimate threat to the ride-through capability of the critical load (and where a transfer to backup power should be allowed) from less critical voltage disturbances (where the switching system may be inclined to transfer to backup power, but where such a transfer would be unwarranted and should be inhibited). Further, the switching system may continue to analyze new disturbance waveforms that do not fit previously establish patterns, learning whether these new waveforms should or should not trigger a transfer to backup power.

Referring to FIG. 1, the intelligent static transfer switching system 100 is shown. The switching system 100 may include a primary power supply 102, one or more alternate or backup power supplies 104, a switching device 106 including one or more processors 108 and memory 110, and a destination facility 112.

In embodiments, the destination facility 112 may be a data center or like facility requiring a critical power load to be provided by the primary power supply 102. For example, under nominal conditions, the switching device 106 may be switched open to the primary power supply 102 to maintain a critical load to the destination facility 112. However, in the event of a voltage disturbance associated with the primary power supply 102, the switching device 106 may disconnect from the primary power supply (e.g., open the switch between the primary power supply and destination facility) and instead connect to the backup power supply 104 (e.g., close the switch between the backup power supply and destination facility) so that the critical load to the destination facility 112 may be maintained without interruption.

In embodiments, the switching system 100 may monitor the source voltage level associated with the primary power supply 102 to ensure that conditions warranting a transfer to the backup power supply 104 are not met, and to initiate the transfer to backup should these conditions be met. For example, transfer conditions may include a drop in source voltage level below a predetermined or preprogrammed low voltage threshold, or a sustained low voltage level below threshold voltage level throughout a preprogrammed time delay.

In embodiments, the switching system 100 may initially operate similarly to conventional static transfer switches in that when transfer conditions are met (e.g., when a voltage drop or disturbance is detected), the switching device 106 may transfer to the backup power supply 104. However, when a voltage disturbance is detected (e.g., when primary voltage drops below a threshold low voltage level), the switching system 100 may sample the source voltage of the primary power supply 102 during and after the transfer, storing the sampled waveform 114 to memory 110 as a reference waveform 116. In embodiments, to ensure an optimally detailed sampled waveform 114, the switching system 100 may sample the source voltage at no less than a minimum sample rate, e.g., 6 kHz).

In embodiments, the switching system 100 may analyze each reference waveform 116 stored to memory 110 to determine and assign an appropriate transfer order to each reference waveform. For example, based on a review of the reference waveform 116 and according to, e.g., ride-through specifications associated with the critical load provided to the destination facility 112 (which may in turn be based power quality curves developed by the Information Technology Industry Council (ITIC), Computer and Business Equipment Manufacturers Association (CBEMA), International Electrotechnical Commission (IEC), and/or other like authorities or trade associations), the switching system 100 may assign an allow-transfer order 118 (allow order) to any sampled reference waveform 116 for which a transfer to the backup power supply 104 was deemed necessary. Similarly, the switching system 100 may assign an inhibit-transfer order 120 (inhibit order) to any sampled reference waveform 116 for which a transfer to the backup power supply 104 was deemed unnecessary. In embodiments, each reference waveform 116 stored to memory may include the assigned transfer order (allow order 118 or inhibit order 120).

In embodiments, the switching system 100 may include a neural network 122 and/or other appropriate machine learning algorithms trained (e.g., based on stored reference waveforms 116) to allow or inhibit an imminent transfer of the switching device 106 to the backup power supply 104 in the event of a detected voltage disturbance fulfilling one or more transfer conditions. For example, the switching device 106 may be provided with a time window wherein a further determination may be made as to whether the detected voltage disturbance warrants a transfer to the backup power supply 104. A small amount of time may always be required for the source voltage to fall below the low voltage threshold; in embodiments, there may always be a finite time delay programmed in (e.g., to filter out spurious voltage transients associated with electrical noise or measurement inaccuracy) such that the below-threshold source voltage must persist for a minimum duration for transfer conditions to be satisfied.

In embodiments, during this time window (e.g., generally on the order of several milliseconds), the neural network 122 may analyze the current sampled waveform 114 in part (e.g., an early portion of the full waveform) to determine if the sampled waveform is substantially similar to a reference waveform 116 stored to memory 110 (e.g., within a predetermined margin of error). For example, when the sampled waveform 114 sufficiently resembles a reference waveform 116 assigned an allow order 118, the neural network 122 may allow the switching device 106 to proceed with a transfer to the backup power supply 104. Similarly, when the sampled waveform 114 sufficiently resembles a reference waveform 116 assigned an inhibit order 120, the neural network 122 may prevent the switching device 106 from transferring to the backup power supply 104. In embodiments, if the neural network 122 determines that a sampled waveform 114 sufficiently resembles a reference waveform 116 assigned either an allow order 118 or an inhibit order 120, the sampled waveform may likewise be stored to memory 110 as a reference waveform having the appropriate allow or inhibit order.

In embodiments, the switching system 100 may further be set or programmed (e.g., via processor/s 108) with a maximum low voltage duration associated with any detected voltage disturbance. For example, if a detected voltage disturbance remains below a low voltage threshold for at least the maximum low voltage duration, even if the sampled waveform 114 sufficiently resembles a reference waveform 116 assigned an inhibit order 120, the neural network 122 may instead allow the switching device 106 to transfer to the backup power supply 104.

In embodiments, if the sampled waveform 114 is matched to a reference waveform 116 assigned an inhibit order 120 but the primary voltage remains below the low voltage threshold for at least the maximum low voltage duration, the switching system 100 may (after executing the allow order 118) further relabel the associated matching reference waveform 116, assigning an allow order in place of the initially assigned inhibit order. Further still, the switching system 100 may also store the sampled waveform 114 as a reference waveform associated with the allow order 118.

Figure 2A:
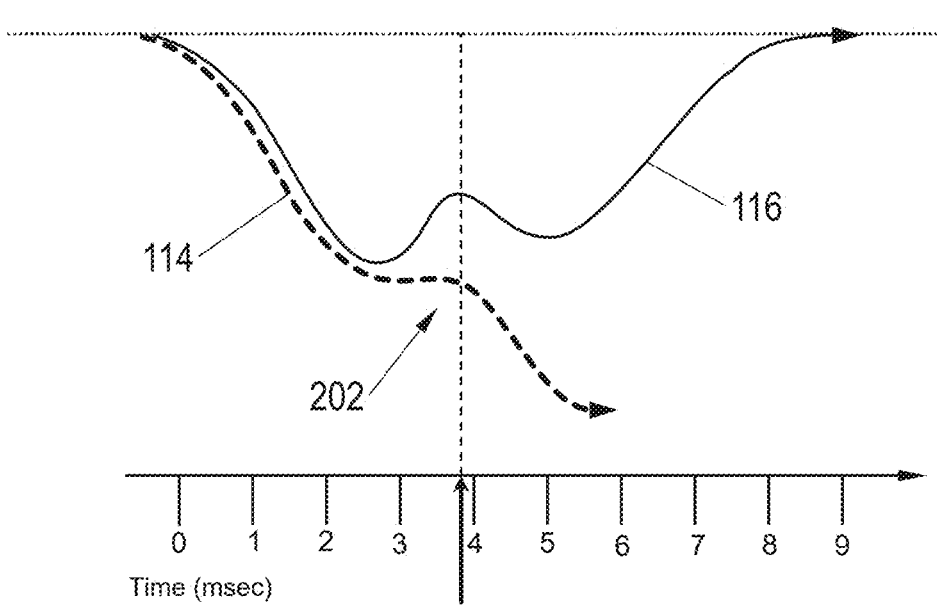
FIG. 2A is a graphical illustration of monitoring operations of the intelligent static transfer switch of FIG. 1, where conditions warranting a transfer to backup power may exist.

In embodiments, referring also to FIG. 2A, as additional sampled voltage waveforms 114 are sampled and analyzed by the switching system 100, the neural network (122, FIG. 1) may continue to learn when to prevent unnecessary transfers to the backup power supply (104, FIG. 1), as well as when conditions warranting a transfer are present, within a shorter time window. For example, the sampled primary waveform 114 may initially resemble a reference waveform 116 assigned an inhibit order (120, FIG. 1), but may diverge (202) relatively early (e.g., between 3 and 4 ms) from the inhibit-assigned reference waveform and instead indicate a sustained voltage drop (e.g., which may continue for at least the maximum low voltage duration as noted above), indicating to the neural network 122 that the switching device (106, FIG. 1) should be allowed to execute the transfer to backup (consistent with an allow order 118).

Figure 2B:
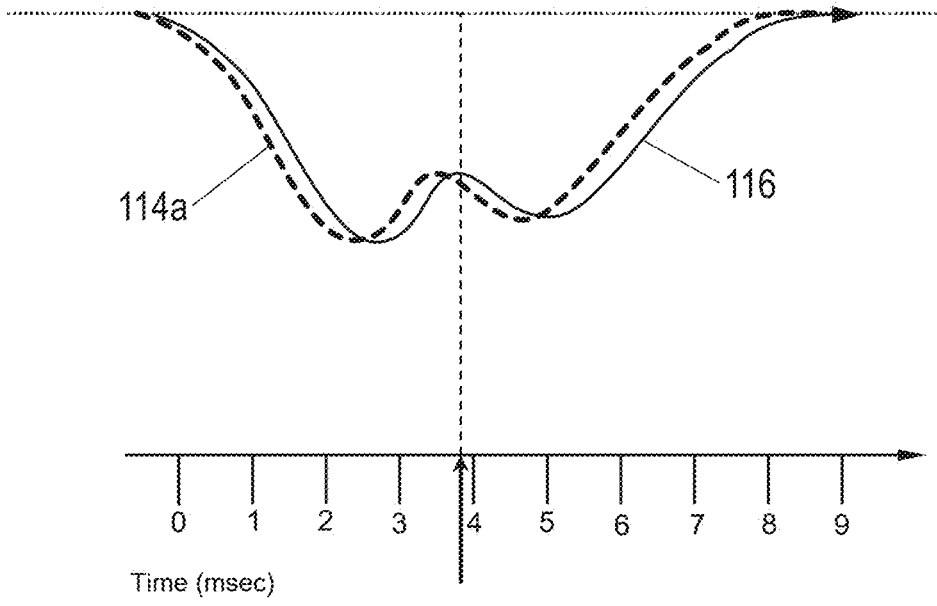
FIG. 2B is a graphical illustration of monitoring operations of the intelligent static transfer switch of FIG. 1, where conditions warranting a transfer to backup power may not exist.

Alternatively, referring also to FIG. 2B, in embodiments the sampled primary waveform (114a) may continue to follow the pattern of the reference waveform 116 associated with an inhibit order 120, indicating that the neural network 122 should prevent the transfer from occurring. Further, early observation of the early divergence 202 by the neural network 122 may allow the transfer to occur more quickly (e.g., between 1 and 2 ms) than a conventional static transfer switch would otherwise react. Further, even when a significant library of reference waveforms 116 is stored to memory (110, FIG. 1) and "learned" by the neural network (120, FIG. 1), the neural network may continue to learn new voltage events and/or patterns as they are identified. Accordingly, the switching system (100, FIG. 1) may provide improved voltage quality for the critical load supplied to the destination facility (112, FIG. 1) as well as overall enhanced stability and reliability for the destination facility.

Figure 3:
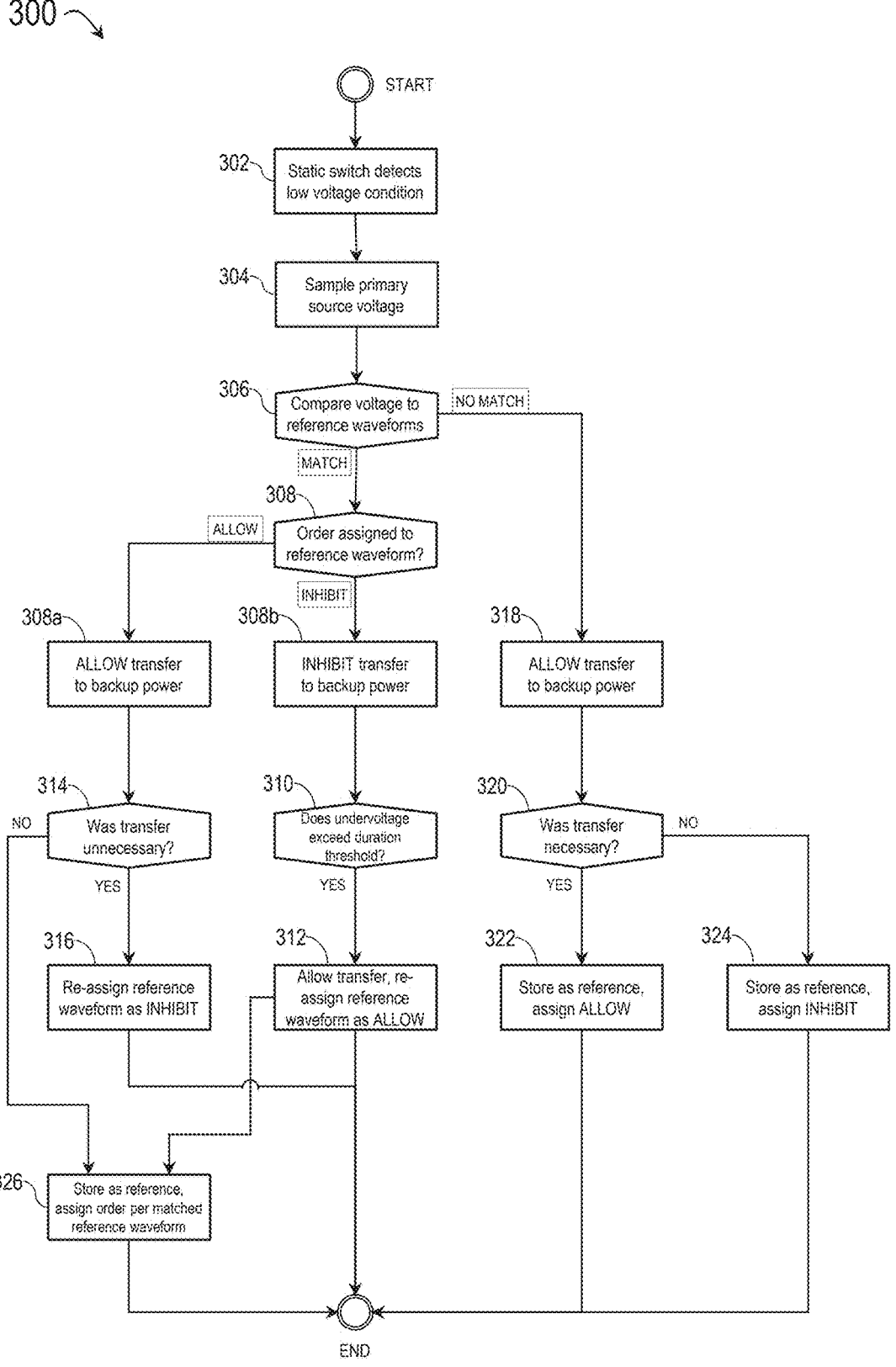
FIG. 3 is a process flow chart diagramming operations of the intelligent static transfer switch of FIG. 1.

Referring now to FIG. 3, the method 300 may be implemented by the intelligent static transfer switching system 100 and may include the following steps.

At a step 302, the switching system detects a voltage disturbance in the primary source voltage sufficient to indicate conditions that may warrant a transfer to backup power are present. For example, a primary source voltage below a low voltage threshold may be indicative of a potential need to transfer to backup power.

At a step 304, the switching system samples the primary source voltage.

At a step 306, the switching system compares the sampled waveform to reference waveforms stored to memory, each reference waveform indicating whether a transfer to backup should be allowed or inhibited in that particular case.

At a step 308, when the sampled primary waveform substantially matches a reference waveform, the switching system refers to the transfer order of the matching reference waveform. For example, at a step 308a, when the matching reference waveform has an allow-transfer order, the switching system allows the switching device to perform the transfer to backup. Similarly, at a step 308b, when the matching reference waveform has an inhibit-transfer order, the switching system prevents the switching device from performing the transfer.

At a step 310, the matching reference waveform may have assigned an inhibit-transfer order but the transfer conditions associated with the sampled primary waveform (e.g., primary voltage below threshold low voltage level) persist beyond a maximum low voltage duration.

When the transfer conditions persist in this fashion, at a step 312 the switching system executes an allow-transfer order for the sampled primary waveform (e.g., allowing the switching device to perform the transfer to backup power).

At a step 314, when the matching reference waveform was associated with an allow-transfer order, and the switching system executes the allow-transfer order directing the switching device to transfer to backup power, the switching system performs subsequent analysis of the sampled primary waveform to confirm that the transfer to backup power was indeed necessary.

At a step 316, if this subsequent analysis indicates the transfer to backup power was unnecessary, the reference waveform is re-assigned an inhibit-transfer order (e.g., relabeled from an allow-transfer order).

At a step 318, when the sampled waveform of the primary voltage source does not match a reference waveform stored to memory, the switching system allows the switching device to perform the transfer to backup power.

At a step 320, the switching system analyzes the sampled primary waveform to determine whether the allowed transfer should have been allowed or should have been inhibited (e.g., was the transfer necessary?).

At a step 322, if the subsequent analysis confirms that the transfer should have been allowed, the sampled primary waveform is stored to memory as a reference waveform with an allow order.

At a step 324, if the subsequent analysis determines that the transfer should have been inhibited, the sampled primary waveform is stored to memory as a reference waveform with an inhibit order.

At a step 326, the switching system saves the sampled primary waveform to memory as a reference waveform, assigning to the sampled primary waveform the transfer order of the matching reference waveform (e.g., allow, inhibit). When, for example, the sampled primary waveform is matched to a reference waveform assigned an allow-transfer order and the transfer to backup power was allowed (step 308a), and subsequent analysis confirms that the transfer was necessary (step 314), the matching primary waveform is saved to a memory as a reference waveform assigned an allow-transfer order. However, when the transfer is determined unnecessary at step 314, and the reference waveform is reassigned an inhibit-transfer order in place of the allow-transfer order (step 316), the sampled primary waveform is likewise assigned an inhibit-transfer order. Similarly, when the matching primary waveform is matched to a reference waveform assigned an inhibit-transfer order and the transfer was inhibited (step 308*b*), but transfer conditions persisted beyond the maximum low voltage duration (step 310) and the reference waveform was reassigned from inhibit-transfer to allow-transfer (step 312), the switching system also assigns the allow-transfer order to the sampled primary waveform.

Referring now to FIG. 4A, the method 400 may be implemented by the intelligent static transfer switching system 100 and may include the following steps.

At a step 402, the switching system stores to memory one or more reference waveforms associated with a primary voltage source. For example, each reference waveform is associated with an allow-transfer order (e.g., allow the transfer to backup power in response to this waveform) or an inhibit transfer order (e.g., do not transfer to backup power in response to this waveform).

At a step 404, a static transfer switch of the switching system provides a primary voltage source from a primary power supply to a data center or other destination facility.

At a step 406, the static transfer switch monitors the voltage level of the primary voltage source.

At a step 408, when the voltage level meets at least one transfer condition (e.g., a drop in source voltage, a sustained low voltage level) the static transfer switch samples a primary waveform associated with the primary voltage source.

At a step 410, the static transfer switch compares the sampled primary waveform to the reference waveforms stored to memory in an attempt to find a match for the primary waveform.

Referring also to FIG. 4B, at a step 412, when the sampled primary waveform sufficiently matches a stored reference waveform, the static transfer switch executes the transfer order assigned to the reference waveform (allow transfer, inhibit transfer).

At a step 414, the static transfer switch assigns the executed transfer order of the reference waveform to the primary waveform.

At a step 416, when the sampled primary waveform does not sufficiently match a reference waveform, the static transfer switch initiates an allow-transfer order by disconnecting from the primary power supply.

At a step 418, the static transfer switch completes the allow-transfer order by connecting to the backup power supply.

At a step 420, the static transfer switch performs subsequent analysis of the primary waveform to determine the proper transfer order to assign, e.g., whether the transfer was necessary (allow-transfer) or not (inhibit-transfer).

Figure 4C:
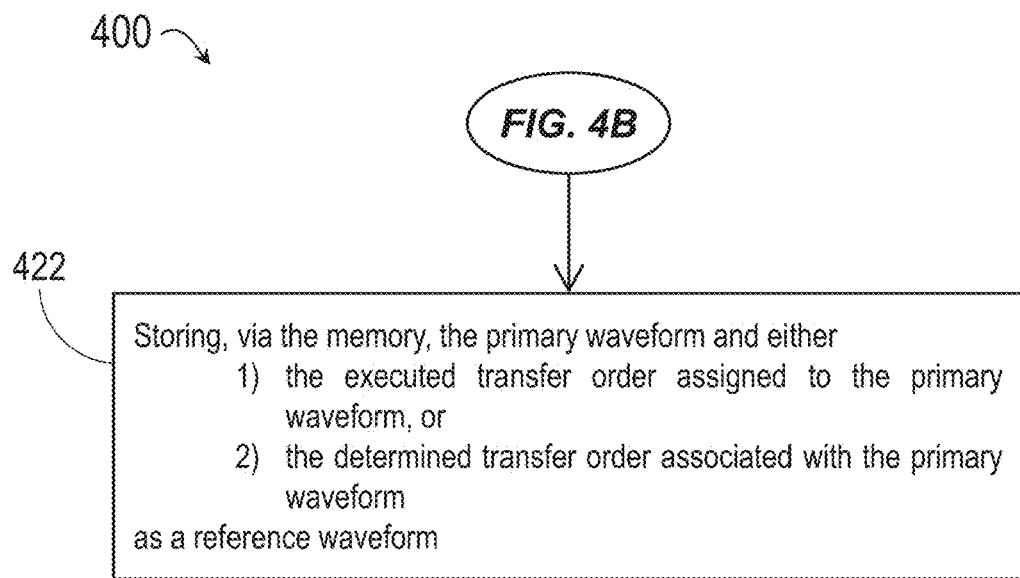

Referring also to FIG. 4C, at a step 422, the static transfer switch stores the primary waveform and its assigned transfer order (e.g., either the executed transfer order of the matching reference waveform, or the determined transfer order based on comparing the primary waveform to non-matching reference waveforms) to memory as a reference waveform.

Figure 4D:
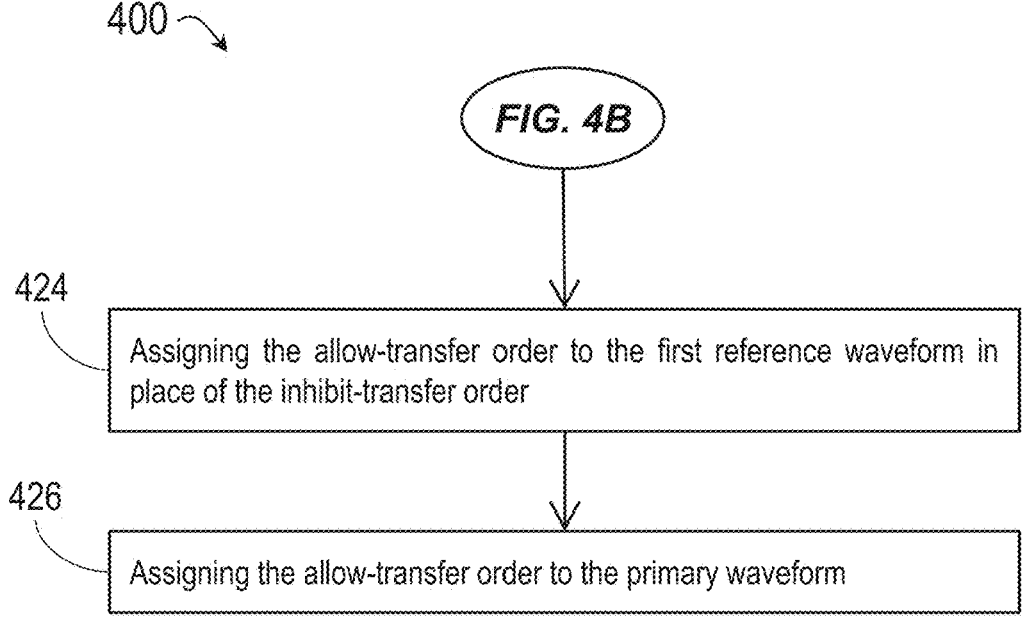

Referring also to FIG. 4D, the method 400 may include additional steps 424 and 426. At the step 424, when the primary waveform was matched to a reference waveform assigned an inhibit-transfer order, but transfer conditions persisted beyond the maximum low voltage duration, the reference waveform is reassigned an allow-transfer order in place of the original inhibit-transfer order.

At a step 426, the primary waveform is also assigned an allow-transfer order.

CONCLUSION

It is contemplated that embodiments of the inventive concepts disclosed herein may have numerous advantages. Broadly speaking, the intelligent static transfer switch will more accurately detect whether an identified voltage disturbance truly warrants a transfer to backup power, enhancing general powertrain stability and reliability and eliminating the need for conventionally over-cautious and/or over-sensitive switching settings that may ensure transfers happen every time they are needed, but only at the expense of numerous unnecessary transfers. Further, as the intelligent switching system continues to "learn" via observation and accumulation of new training data, the switching system may make these detections sooner.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtu- ally any combination thereof, and that designing the cir- cuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustra- tive embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "elec- trical circuitry" includes, but is not limited to, electrical circuitry having at least one discrete electrical circuit, elec- trical circuitry having at least one integrated circuit, elec- trical circuitry having at least one application specific inte- grated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical cir- cuitry forming a memory device (e.g., forms of random access memory), and/or electrical circuitry forming a com- munications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or pro- cesses into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/ communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrange- ment of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial com- ponents. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting compo- nents and/or logically interacting and/or logically inter- actable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

We claim:

1. An intelligent static transfer switch, comprising:
a switching device couplable to a primary power supply and to at least one backup power supply,
wherein the switching device is configured to provide a primary voltage source from the primary power supply to a destination facility when coupled to the primary power supply,
a memory configured for storage of one or more reference waveforms associated with the primary voltage source, each reference waveform assigned a transfer order;
at least one processor coupled to the switching device and to the memory, the at least one processor configured to:
monitor a voltage level associated with the primary voltage source;
when the voltage level meets at least one transfer condition:
sample a primary waveform associated with the primary voltage source;
compare the sampled primary waveform to the one or more reference waveforms;
when the sampled primary waveform matches a first reference waveform of the one or more reference waveforms:
executing, via the switching device, the transfer order assigned to the first reference waveform; and
assigning the executed transfer order to the pri- mary waveform;
and when the primary waveform does not match the one or more reference waveforms:

disconnecting the switching device from the primary power supply;

connecting the switching device to the backup power supply;

and determining a transfer order to be assigned to the primary waveform by analyzing the sampled primary waveform.

2. The intelligent static transfer switch of claim 1, wherein the at least one processor is configured to store to the memory the sampled primary waveform and either 1) the executed transfer order assigned to the primary waveform or 2) the determined transfer order assigned to the primary waveform as a reference waveform.

3. The intelligent static transfer switch of claim 1, wherein each of the executed transfer order assigned to the first reference waveform and the determined transfer order assigned to the primary waveform is either:

an allow-transfer order directing the static transfer switch to disconnect from the primary power supply and connect to a backup power supply;

or an inhibit-transfer order preventing the static transfer switch from disconnecting from the primary power supply.

4. The intelligent static transfer switch of claim 3, wherein the executed transfer order assigned to the reference waveform is an inhibit-transfer order, and:

wherein the transfer condition persists for at least a predetermined maximum time;

and wherein the at least one processor is configured to execute an allow-transfer order directing the static transfer switch to disconnect from the primary power supply and connect to the backup power supply.

5. The intelligent static transfer switch of claim 4, wherein the at least one processor is configured to:

assign the allow-transfer order to the first reference waveform in place of the inhibit-transfer order;

and assign the allow-transfer order to the primary waveform.

6. The intelligent static transfer switch of claim 1, wherein the at least one transfer condition corresponds to the voltage level falling below a threshold voltage level.

7. The intelligent static transfer switch of claim 1, wherein the at least one processor is configured to determine whether the transfer order assigned to the primary waveform is an allow-transfer order or an inhibit-transfer order based on comparing the sampled primary waveform to the one or more reference waveforms.

8. The intelligent static transfer switch of claim 1, further comprising:

at least one neural network configured to execute on a processor of the static transfer switch, the neural network trained via at least one machine learning algorithm to determine whether the transfer order assigned to the primary waveform is an allow-transfer order or an inhibit-transfer order.

9. The intelligent static transfer switch of claim 1, wherein the at least one processor is configured to sample the primary waveform at not less than 6 kHz.

10. A method for intelligent static transfer switching, the method comprising:

storing, via a memory of a static transfer switch, one or more reference waveforms associated with a primary voltage source, each reference waveform assigned a transfer order;

providing, via the static transfer switch, a primary voltage source from a primary power supply to a destination facility;

monitoring, via the static transfer switch, a voltage level associated with the primary voltage source;

when the voltage level meets at least one transfer condition:

sampling a primary waveform associated with the primary voltage source;

comparing the sampled primary waveform to the one or more reference waveforms;

when the primary waveform matches a first reference waveform of the one or more reference waveforms:

executing, via the static transfer switch, the transfer order assigned to the first reference waveform;

and assigning the executed transfer order to the primary waveform;

and when the primary waveform does not match the one or more reference waveforms:

disconnecting the static transfer switch from the primary power supply;

connecting the static transfer switch to a backup power supply;

and determining, via, via the static transfer switch, a transfer order associated with the primary waveform by analyzing the primary waveform.

11. The method of claim 10, further comprising:

storing, via the memory, the primary waveform and either 1) the executed transfer order assigned to the primary waveform or 2) the determined transfer order associated with the primary waveform as a reference waveform.

12. The method of claim 10, wherein each of the transfer order associated with the primary waveform and the executed transfer order is either:

an allow-transfer order directing the static transfer switch to disconnect from the primary power supply and connect to a backup power supply;

or an inhibit-transfer order preventing the static transfer switch from disconnecting from the primary power supply.

13. The method of claim 12, wherein the executed transfer order is an inhibit-transfer order, the transfer condition persists for at least a predetermined maximum time, and:

wherein executing, via the static transfer switch, the transfer order assigned to the first reference waveform includes:

executing an allow-transfer order directing the static transfer switch to disconnect from the primary power supply and connect to the backup power supply.

14. The method of claim 13, further comprising:

assigning the allow-transfer order to the first reference waveform in place of the inhibit-transfer order;

and assigning the allow-transfer order to the primary waveform.

15. The method of claim 10, wherein the at least one transfer condition corresponds to the voltage level falling below a threshold voltage level.

16. The method of claim 10, wherein determining, via, via the static transfer switch, a transfer order associated with the primary waveform by analyzing the primary waveform includes:

determining whether the associated transfer order is an allow-transfer order or an inhibit-transfer order based on comparing the primary waveform to the one or more reference waveforms.

17. The method of claim 10, wherein determining, via, via the static transfer switch, a transfer order associated with the primary waveform by analyzing the primary waveform includes:

determining whether the associated transfer order is an allow-transfer order or an inhibit-transfer order via at least one neural network configured to execute on a processor of the static transfer switch, the at least one neural network trained via at least one machine learning algorithm.

18. The method of claim 10, wherein sampling a primary waveform associated with the primary voltage source includes:

sampling the primary waveform at not less than 6 kHz.

\* \* \* \* \*